United States Patent [19]

Imai et al.

[11] Patent Number: 4,662,120
[45] Date of Patent: May 5, 1987

[54] CAM GRINDING MACHINE

[75] Inventors: Tomoyasu Imai, Kariya; Ryouhei Mukai, Toyoake; Toshihiro Tsutsui, Nishio, all of Japan

[73] Assignee: Toyoda Koki Kabushiki Kaisha, Kariya, Japan

[21] Appl. No.: 825,899

[22] Filed: Feb. 4, 1986

[30] Foreign Application Priority Data

Mar. 20, 1985 [JP] Japan .................. 60-56608

[51] Int. Cl.⁴ .......................................... B24B 17/10
[52] U.S. Cl. .................. 51/101 R; 51/165.71
[58] Field of Search ............... 51/101 R, 105, 165.71, 51/165 TP; 364/474

[56] References Cited

U.S. PATENT DOCUMENTS

| | | | |
|---|---|---|---|
| 4,094,105 | 6/1978 | Hatanaka et al. | 51/101 R |
| 4,262,454 | 4/1981 | Iida et al. | 51/101 R |
| 4,373,301 | 2/1983 | Parnum et al. | 51/101 R |
| 4,400,781 | 8/1983 | Hotta et al. | 364/474 |
| 4,525,958 | 8/1985 | Reissig | 51/101 R |

FOREIGN PATENT DOCUMENTS 125973 9/1980 Japan .................. 51/101 R

*Primary Examiner*—Harold D. Whitehead
*Attorney, Agent, or Firm*—Oblon, Fisher, Spivak, McClelland & Maier

[57] ABSTRACT

A cam grinding machine of the type in which a grinding wheel is moved toward and away from a cam shaft rotatably supported on a table, thereby to shape intake and exhaust cams of said cam shaft to predetermined profiles, the cam grinding machine comprising: means for detecting the machined condition of the cams in spark-out grinding; means for setting spark-out ending conditions separately for the intake and exhaust cams; means for judging whether the machined condition in spark-out has reached a level complying with the spark-out ending condition, separately with respect to the intake and exhaust cams; and means for stopping the spark-out when the machined condition comes into compliance with the spark-out ending condition.

4 Claims, 7 Drawing Figures

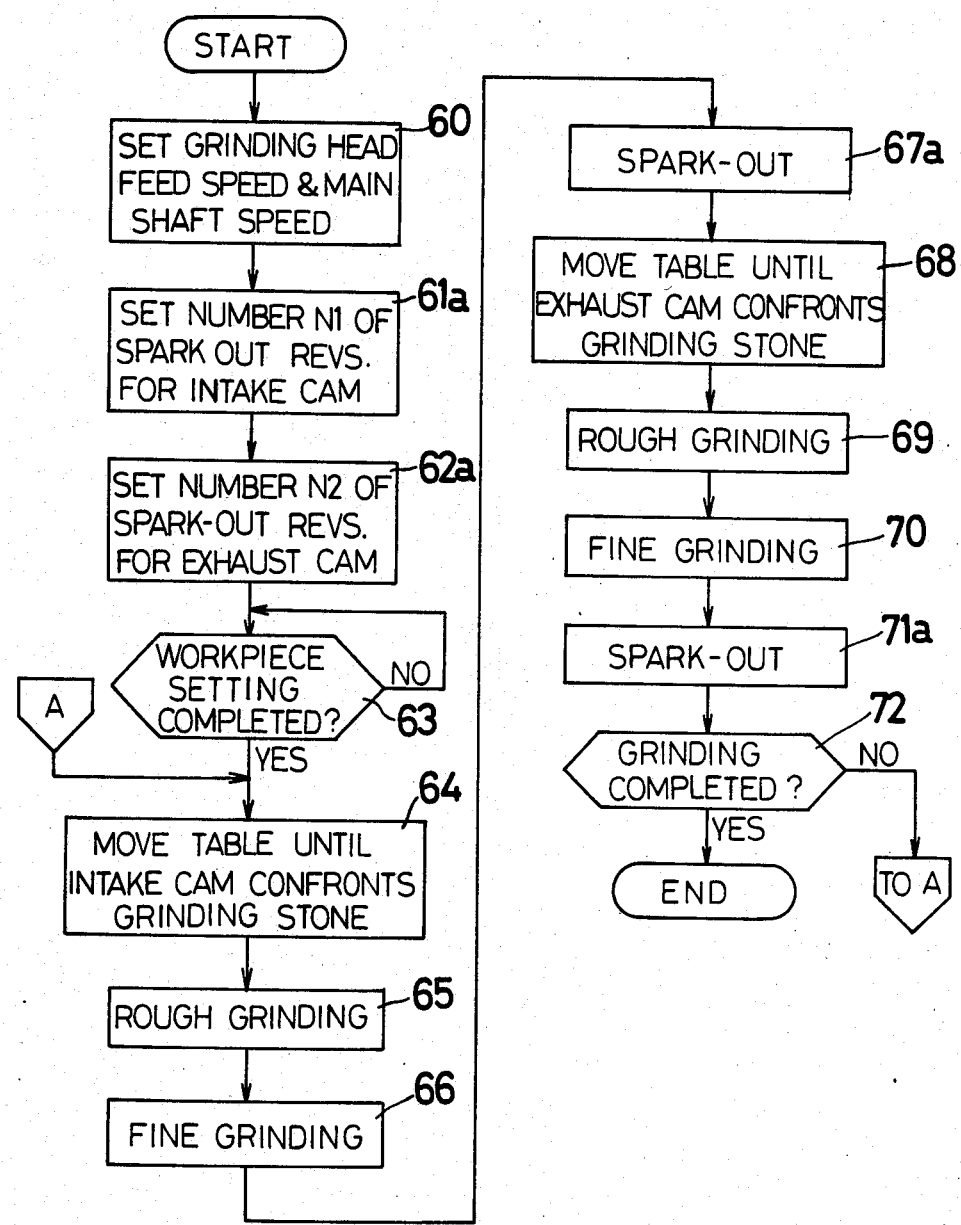

CAM GRINDING MACHINE

BACKGROUND OF THE INVENTION

1. Field of the Invention

This invention relates to a cam grinding machine for shaping cams into predetermined profiles.

2. Description of the Prior Art

The cam shafts which are employed as engine parts are provided with plural numbers of intake cams and exhaust cams in alternate positions. These cams are usually ground to predeterimed profiles by means of a cam grinding machine which is arranged to jiggle the cam shaft relative to a grinding wheel according to the contours of master cams.

The intake and exhaust cams on a cam shaft of this sort have different shapes, so that, if they are ground by the same machining cycle, profile errors occur to the intake and exhaust cams in different degrees. As a result, there arises a problem that one type of cam is unacceptable in accuracy while the other type of cam is acceptable. In a case where the machining cycle is changed, prolonging the spark-out time to hold the cams of the other type within a required tolerance, there will arise another problem that the machining time for each cam shaft becomes too long.

SUMMARY OF THE INVENTION

The present invention has as its object the provision of a cam grinding machine which can eliminate the above-mentioned problems.

More particularly, according to the present invention, there is provided a cam grinding machine which essentially comprises in combination: means for detecting the machined condition of a cam in spark-out grinding; means for setting a spark-out ending condition separately for intake cam and exhaust cams; means for judging whether or not the machined condition in spark-out has reached the spark-out ending condition; and means for ending the spark-out when the grinding condition in spark-out comes into conformity with the spark-out ending condition.

The above and other objects, features and advantages of the invention will become apparent from the following description and the appended claims, taken in conjunction with the accompanying drawings which show by way of example some preferred embodiments of the invention.

BRIEF DESCRIPTION OF THE DRAWINGS

In the accompanying drawings:

FIGS. 5 to 7 are flowcharts of cam grinding operation in further embodiments of the invention.

DESCRIPTION OF PREFERRED EMBODIMENTS

Figure 1:
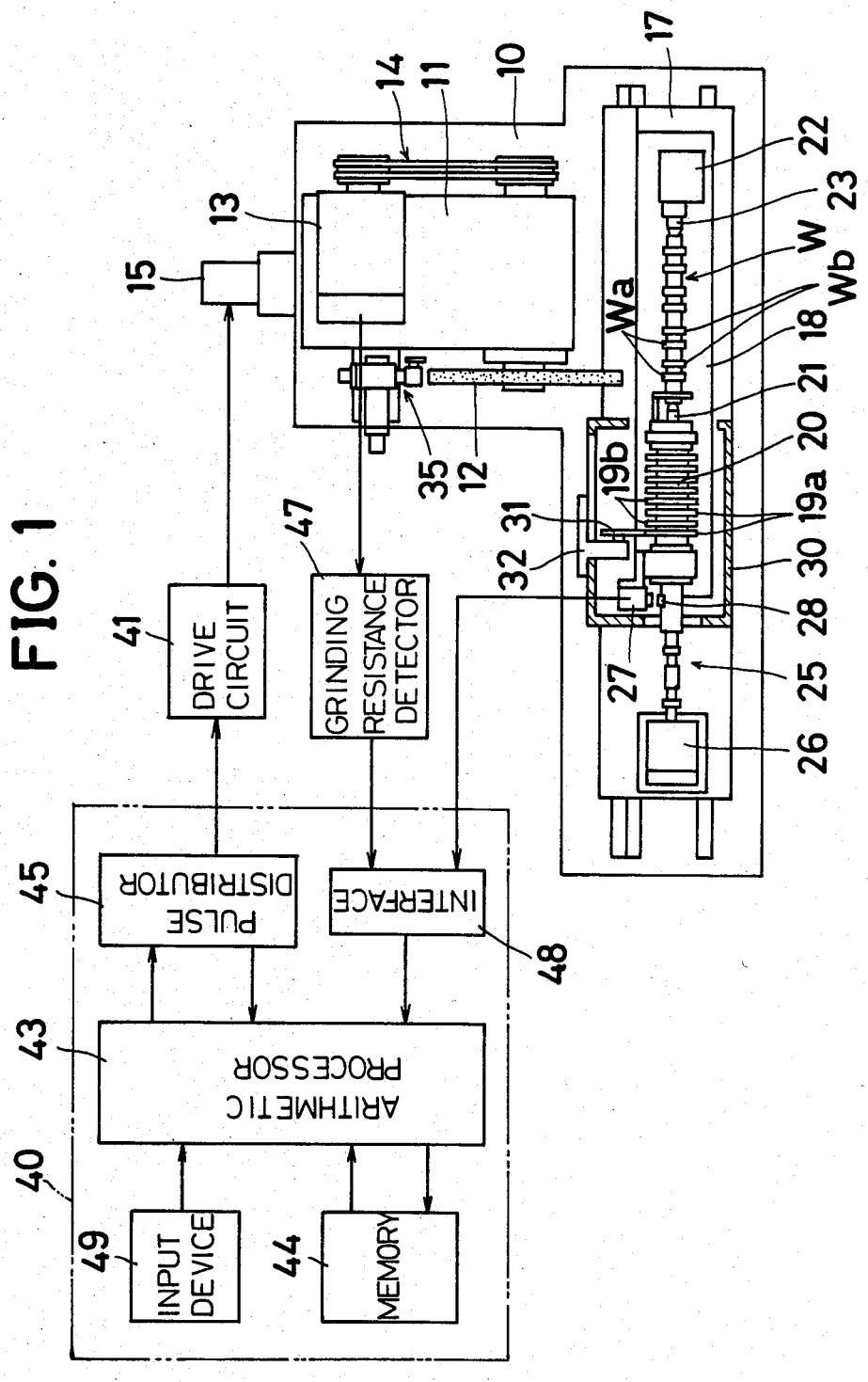
FIG. 1 is a diagrammatic view of a cam grinding machine embodying the present invention.

Referring to FIG. 1, there is shown a cam grinding machine according to the invention, in which denoted at 10 is a bed for the grinding machine and at 11 is a grinding head which is reciprocably mounted on the bed 10. Rotataby supported on a grinding head 11 is a grinding wheel 12 of ultra hard abrasive grains such as CBN, the grinding wheel 12 being rotationally driven from a drive motor 13 which is mounted on the grinding head 11, through a belt transmission 14. In turn, the grinding head 11 is moved back and forth by a feed mechanism including a servo motor 15 as a drive source.

Further, a table 17 is mounted on the bed 10 for sliding movements in a direction perpendicular to the direction of the reciprocal movements of the grinding head 11, and indexed by an indexing mechanism which is not shown. Rockably mounted on the table 17 is a rocking support 18 which rotatably supports thereon, on the left side in the drawing, a main shaft 20 having a plural number of master cams 19a for the intake cams and a plural number of master cams 19b for the exhaust cams fitted thereon. On the other hand, a cam shaft W which has a plural number of intake cams Wa and a plural number of exhaust cams Wb corresponding to the master cams 19a and 19b, respectively, is rotatably supported between a center 21 of the main shaft 20 and a center 23 of a tail stock 22 located at the right end of the rocking support 18. The intake cams Wa and exhaust cams Wb are of different profiles. The main shaft 20 is connected through a universal joint 25 to a main shaft drive motor 26 which is mounted on the table 17, thereby to rotate the main shaft 20 and the cam shaft W integrally with each other.

Mounted on the rocking support 18 is a detector 27 which is adapted to produce a signal at every one revolution of the main shaft 20 by sensing a dog 28 which is positioned on the circumference of the main shaft 20.

Mounted on a main shaft support 30 on the table 17 is a retainer 32 which is movable in the axial direction of the main shaft and in which a follower roller 31 is journalled opposingly to the master cams 19a and 19b. Each time when a cam Wa or Wb of the cam shaft W is indexed to a grinding position, the follower roller 31 is indexed to a position confronting the master cam 19a or 19b corresponding to the cam Wa or Wb by operation of an indexing mechanism which is not shown. As known in the art, the master cam 19a and 19b are pressed against the follower roller 31 by the spring force which causes the rocking motion of the rocking support 18 and disenaged from the latter by the rocking motion of the rocking support 18 which is imparted by the cylinder device.

Designated at 35 is a truing mechanism which is adapted to perform truing of the grinding wheel 12 after machining a predetermined number of cam shafts W.

At 40 is a numerical control unit which distributes pulses to a drive circuit 41 for the servo motor 15 to control the feed of the grinding head 11, the numerical control unit 40 being mainly constituted by an arithmetic processing device 43, a memory 44, a pulse distributor 45 and an input device 49. Indicated at 47 is a grinding resistance detector which receives as its input the power consumption by the grinding wheel drive motor 13 to detect the grinding resistance. The output of the detector 47 is fed to the arithmetic processing device 43 through an interface 48. The arithmetic processing device 43 is also supplied with the revolution signal from the afore-mentioned detector 27 through the interface 48. The memory 44 stores therein the machining programs for grinding the cams Wa and Wb on the cam shaft W, along with a reference grinding resistance F1 for the intake cam Wa and a reference grinding resistance F2 for the exhaust cam Wb based on spark-out test data. These machining programs and reference grinding resistances F1 and F2 are loaded into the memory 44 from the input device 49 through the arithmetic processing device 43.

Figure 2:
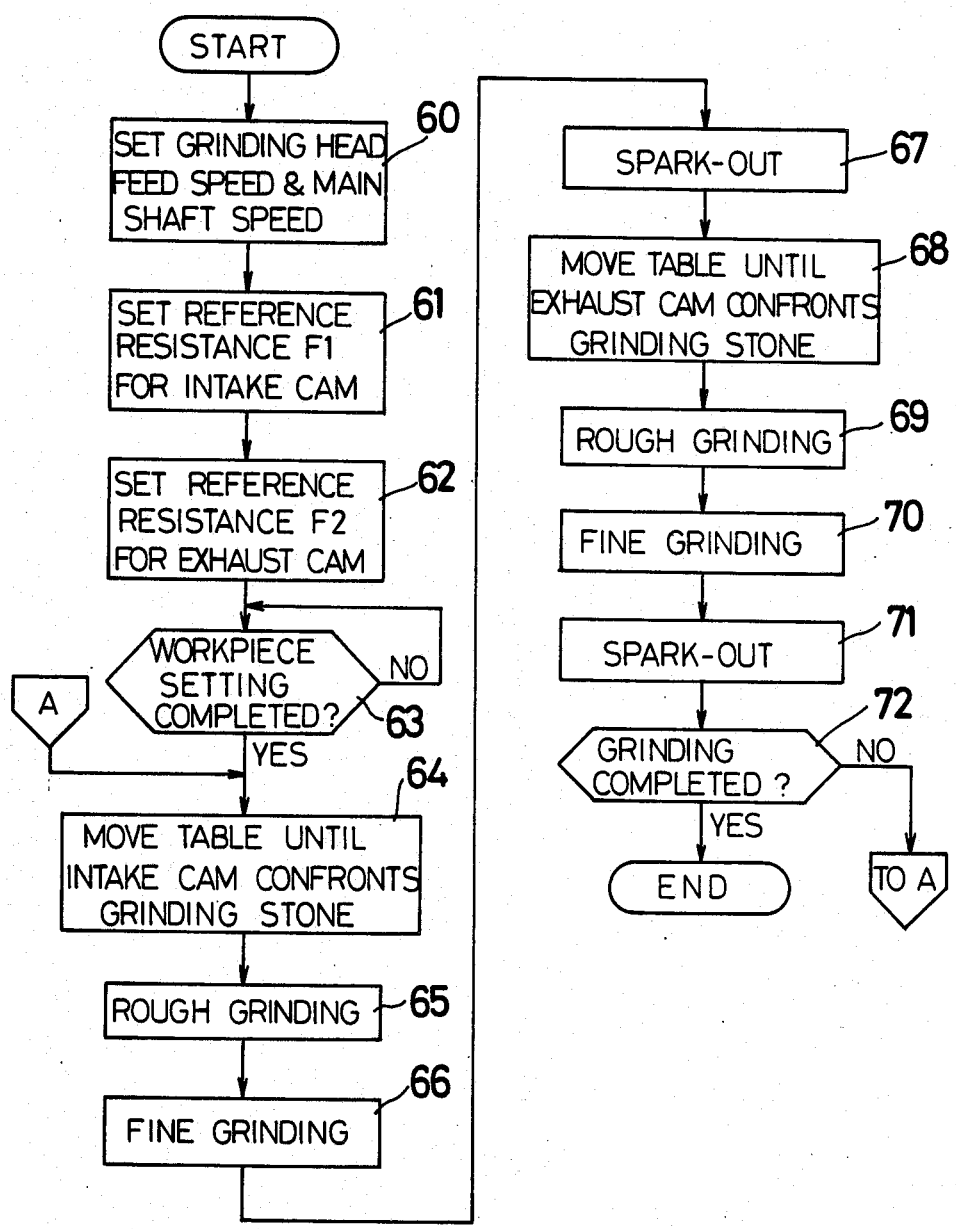
FIG. 2 is a flowchart of a cycle of the cam grinding operation.
Figure 3:
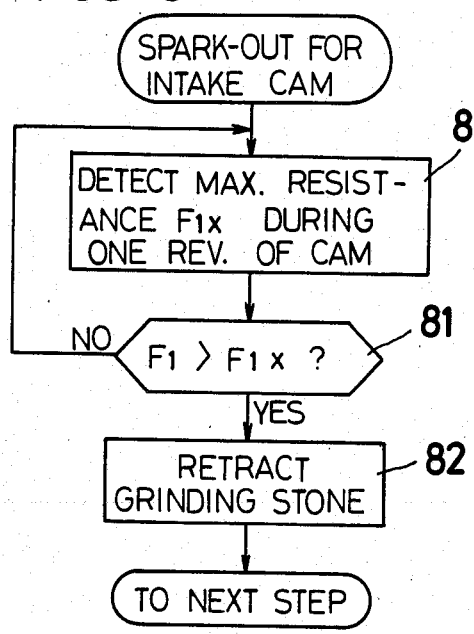
FIGS. 3 and 4 are flowcharts of spark-out processing.

Reference is now had to FIGS. 2 and 3 which shows the steps of the machining operations for the cams Wa and Wb on the grinding machine of the above-described construction. Firstly, in Step 60 of FIG. 2, the machining program including the feed speed of the grinding head 11 and the rotational speed of the main shaft 20 is loaded into the memory 44 from the input device 49 through the arithmetic processing device 43 prior to machining of a cam shaft W. In Steps 61 and 62, the reference grinding resistances F1 and F2 for the intake and exhaust cams Wa and Wb are stored in the memory. After completion of the program set-up operation, the cam shaft W is set in the position between the center 21 of the main shaft 20 and the center 23 of the center pressing block 22. In this state, upon pressing a start button which is not shown, the operation proceeds from Step 63 to Step 64, in which the table 17 is traversed to a position where the leftmost cam Wa confronts the grinding wheel 12, and at the same time the retainer 32 is indexed to a position where the leftmost master cam 19a confronts the follower roller 31. Then, Steps 65 and 66 are executed, advancing the grinding head 11 while rotating the grinding wheel 12 and cam shaft W to perform rough and fine grinding of the cam Wa. By execution of Step 67, the advancement of the grinding head 11 is stopped for spark-out grinding. Upon completion of the spark-out grinding, the grinding head 11 is retracted in Step 68, succeedingly traversing the table 17 to a position where the leftmost cam Wb confronts the grinding wheel 12, and indexing the retainer 32 to a position where the leftmost master cam 19b confronts the follower roller 31. Thereafter, Steps 69 to 71 are successively executed, machining the cam Wb by a machining cycle substantially same as that of the cam Wa. In this instance, different spark-out operations are performed for the intake and exhaust cams Wa and Wb. If all of the cams have not yet been machined, the operation is returned to Step 64 from Step 72, repeating the above-described operations for the remaining intake and exhaust cams Wa and Wb until all cams are profiled.

The above-mentioned spark-out grinding is intended for the removal of extra stock to enhance the accuracy of the cam profile. Greater the amount of extra stock, greater becomes the grinding resistance F. This grinding resistance F is detected on the basis of variations in power consumption by the grinding wheel drive motor 13.

As the spark-out grinding for the intake cam Wa is initiated in Step 67, the maximum grinding resistance F1x in one revolution of the cam is obtained from the output signal of the grinding resistance detector 47 in Step 80 of FIG. 3. This maximum grinding resistance is compared with the reference grinding resistance F1 in Step 81 to judge if it is smaller than the reference value. If the result is "No", the operation is returned to Step 80, and the maximum grinding resistance F1 in one revolution of the cam is detected similarly and compared again with the reference resistance F1 in Step 81.

With the progress of the spark-out grinding, the maximum grinding resistance F1x in one revolution of the cam gradually drops and, as soon as it is found to be smaller than the reference grinding resistance F1, a command of retraction of the grinding head 11 is dispatched in Step 82 to complete the spark-out grinding of the intake cam Wa.

Figure 4:
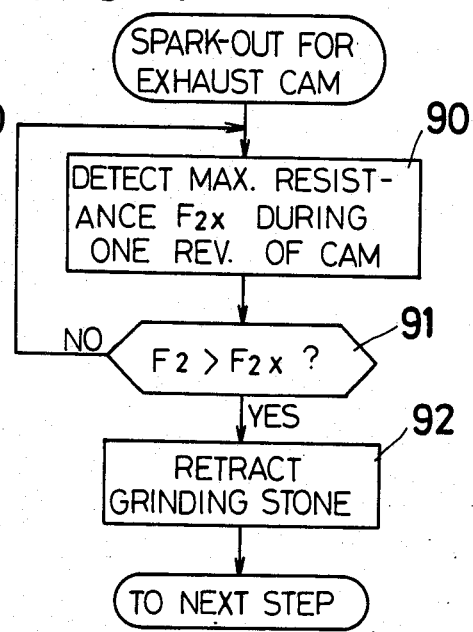

The spark-out grinding of the exhaust cam Wb in Step 71 of FIG. 2 is performed in a similar manner according to Steps 90 to 92 of FIG. 4. Accordingly, if the maximum grinding resistance F2x in one revolution of the cam is detected to be smaller than the reference grinding resistance F2 in Step 91, retracting the grinding head 11 in Step 92 to complete the spark-out grinding for the exhaust cam Wb.

The reference resistances F1 and F2 for the intake and exhaust cams Wa and Wb are set at different values. If they are set at the same level, both will fall in a tolerable profile error range, but one cam will have greater variations in profile error than the other cam relative to the angle, giving rise to a problem of failing to attain a tolerance in profile error variation rate (the profile error as differentiated by the angle). In order to avoid these problems, the reference resistances which fall in the tolerable range of profile error variation are determined beforehand by test grinding separately for the intake cam Wa and exhaust cam Wb.

By setting different reference resistances separately for the intake and exhaust cams Wa and Wb in this manner, both of these cams fall in acceptable ranges in profile error and profile error variation rate. Besides, this can be attained by a machining operation which is only necessary for attaining a required accuracy, that is to say, without excessive spark-out grinding, so that the spark-out grinding for each cam is set in an optimum time period, shortening the machining time per unit cam shaft.

Figure 6:
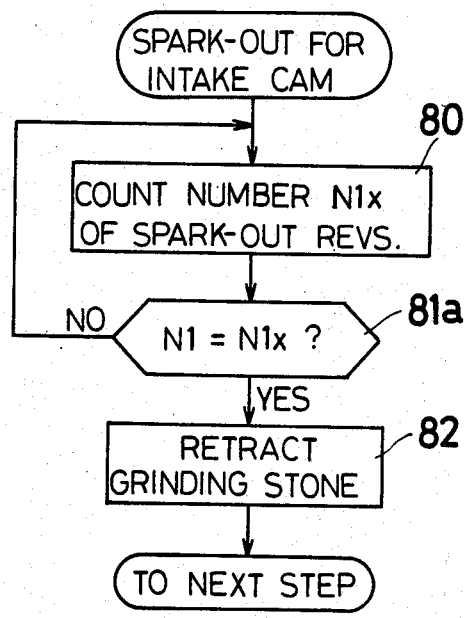
Figure 7:
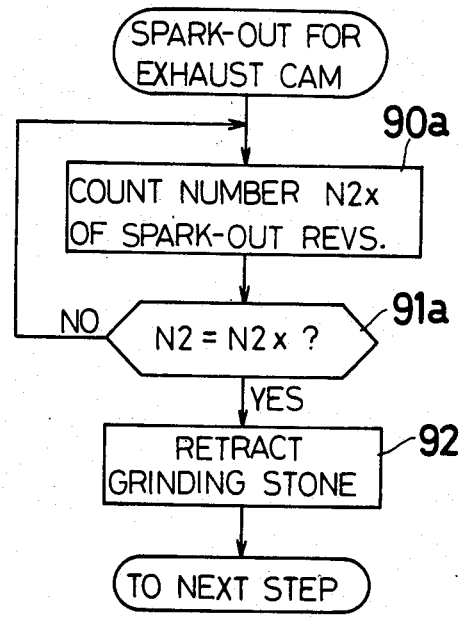

Although the reference grinding resistances for the intake and exhaust cams Wa and Wb are set at different levels in the foregoing embodiment, it is also possible to set, as shown in Steps 61a and 62b of FIG. 5, the numbers of revolutions N1 and N2 in spark-out grinding separately for the intake and exhaust cams Wa and Wb, which are determined beforehand by test grinding. In this instance, as shown in Steps 81a and 91a of FIGS. 6 and 7, the grinding head 11 is retracted at a time point when the number of revolutions N1x in spark-out of the intake cam Wa reaches the reference number N1 and at a time point when the number of revolutions N2x in spark-out of the exhaust cam reaches the reference number N2. The term "number of revolutions in spark-out" means the number of revolutions of a work during the spark-out grinding, which is detected by counting the output signals of the detector 27 shown in FIG. 1. Accordingly, the grinding resistance detector 47 can be omitted in this second embodiment.

In the above-described first embodiment of the invention, the grinding resistance in spark-out is shown as being detected from the power consumption of the grinding wheel drive motor 13. However, it is also possible to detect it by means of a strain gauge which is bonded to the tail stock center, or from the pressure difference between the front and rear pockets of the hydraulic bearing which supports the grinding wheel 12.

As clear from the the foregoing description, the present invention presets the spark-out ending conditions separately for the intake and exhaust cams, terminating the spark-out grinding as soon as the work condition in spark-out comes to meet the spark-out ending condition. Therefore, it becomes possible to comply with the accuracy requirements on both of the intake and exhaust cams by a minimum necessary machining operation for a required accuracy or by a machining operation without excessive spark-out grinding, permitting to shorten the machining time per unit cam shaft.

Obviously, numerous modifications and variations of the present invention are possible in light of the above teachings. It is therefore to be understood that within the scope of the appended claims, the present invention may be practiced otherwise than as specifically described herein.

What is claimed is:

1. A cam grinding machine of the type in which a grinding head with a grinding wheel is moved toward and away from a cam shaft rotatably supported on a table, thereby to shape intake and exhaust cams of said cam shaft to predetermined profiles, said cam grinding machine comprising:

means for detecting the machined condition of said cams in spark-out;

means for setting spark-out ending conditions separately for said intake and exhaust cams;

means for judging whether the machined condition in spark-out has reached a level complying with the spark-out ending condition, separately with respect to said intake and exhaust cams; and means for stopping the spark-out when the machined condition comes into compliance with said spark-out ending condition.

2. The cam grinding machine of claim 1, wherein said means for detecting the machined conditions of said cams is arranged to detect the grinding resistances of said cams in spark-out grinding, and said means for stopping the spark-out is arranged to compare said grinding resistances with preset reference values.

3. A cam grinding machine as set forth in claim 2, wherein said grinding resistances are detected from variations in power consumption of a drive motor for said grinding wheel.

4. A cam grinding machine as set forth in claim 1, wherein said means for detecting the machined condition is arranged to detect the number of revolutions of said cams in spark-out grinding, and said spark-out stopping means is arranged to terminate the spark-out grinding when the number of revolutions reaches a preset reference value.

* * * * *